(12) United States Patent  
Tassoumt et al.

(10) Patent No.: US 11,381,589 B2
(45) Date of Patent: Jul. 5, 2022

(54) SYSTEMS AND METHODS FOR DISTRIBUTED EXTENDED COMMON VULNERABILITIES AND EXPOSURES DATA MANAGEMENT

(71) Applicant: Secureworks Corp., Wilmington, DE (US)

(72) Inventors: Mehdi Tassoumt, Edinburgh (GB); Wayne Haber, Alpharetta, GA (US)

(73) Assignee: Secureworks Corp., Wilmington, DE (US)

( * ) Notice: Subject to any disclaimer, the term of this patent is extended or adjusted under 35 U.S.C. 154(b) by 316 days.

(21) Appl. No.: 16/599,266

(22) Filed: Oct. 11, 2019

(65) Prior Publication Data
US 2021/0112087 A1   Apr. 15, 2021

(51) Int. Cl.
*H04L 9/00*   (2022.01)
*H04L 9/40*   (2022.01)
(Continued)

(52) U.S. Cl.
CPC ..... *H04L 63/1433* (2013.01); *G06Q 30/0208* (2013.01); *G06Q 30/0215* (2013.01); *H04L 9/0637* (2013.01); *H04L 63/1416* (2013.01)

(58) Field of Classification Search
CPC ............ H04L 63/1433; G06Q 30/0208; G06Q 30/0215
(Continued)

(56) References Cited

U.S. PATENT DOCUMENTS

| 5,937,066 A | 8/1999 | Gennaro et al. |
| 6,357,010 B1 | 3/2002 | Viets et al. |

(Continued)

FOREIGN PATENT DOCUMENTS

| EP | 3599753 A1 | 1/2020 |
| RU | 2738344 C1 | 12/2020 |

(Continued)

OTHER PUBLICATIONS

Buyukkayhan, Ahmet Sali; Oprea, Alina; Li, Zhou; and Robertson, William; "Lens on the endpoint; Hunting for malicious software through endpoint data analysis"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

(Continued)

*Primary Examiner* — Christopher J Brown
(74) *Attorney, Agent, or Firm* — Womble Bond Dickinson (US) LLP (57) ABSTRACT

In one aspect, the present disclosure is directed to systems and methods for validating and securely storing security entry updates. The security entry update is received from a contributor, and broadcast to a plurality of computing nodes. It then is determined whether to validate the received security update at each computing node of the plurality of computing nodes. If the received security entry update is validated, information relating to the received security update is added as transaction information in a current block, the current block is included in a blockchain that is stored in a datastore of each computing node of the plurality of computing nodes. Other aspects also are described.

17 Claims, 10 Drawing Sheets

(51) Int. Cl.
   *H04L 9/06* (2006.01)
   *G06Q 30/02* (2012.01)

(58) Field of Classification Search
   USPC .......................................................... 726/25
   See application file for complete search history.

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,492,957 B1 | 2/2009 | Bonhaus |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,928,476 B2 | 1/2015 | Jerhotova et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,742,559 B2 | 8/2017 | Istodorescu |
| 9,767,302 B2 | 9/2017 | Lim |
| 9,805,202 B2 | 10/2017 | Medeiros et al. |
| 9,832,022 B1 | 11/2017 | Pedersen |
| 9,910,986 B1 | 3/2018 | Saxe |
| 9,973,524 B2 | 5/2018 | Boyer |
| 10,050,992 B2 | 8/2018 | Thyni |
| 10,116,500 B1 | 10/2018 | Long |
| 10,169,937 B1 | 1/2019 | Zwink et al. |
| 10,311,231 B1 | 6/2019 | Kayyoor |
| 10,356,125 B2 | 7/2019 | Goutal et al. |
| 10,382,489 B2 | 8/2019 | Das |
| 10,419,903 B2 | 9/2019 | Singh et al. |
| 10,425,223 B2 | 9/2019 | Roth |
| 10,474,820 B2 | 11/2019 | Manadhata |
| 10,491,632 B1 | 11/2019 | Natarajan |
| 10,567,407 B2 | 2/2020 | Tang et al. |
| 10,594,713 B2 | 3/2020 | McLean |
| 10,601,865 B1 | 3/2020 | Mesdaq et al. |
| 10,728,263 B1 | 7/2020 | Neumann |
| 10,762,206 B2 | 9/2020 | Titonis et al. |
| 10,790,982 B2 | 9/2020 | Clements |
| 10,834,128 B1 | 11/2020 | Rajogopalan et al. |
| 10,853,431 B1 | 12/2020 | Lin et al. |
| 10,915,828 B2 | 2/2021 | Qhi |
| 11,044,263 B2 | 6/2021 | McLean et al. |
| 11,165,862 B2 * | 11/2021 | Austin .................. H04L 9/0643 |
| 2002/0129135 A1 | 9/2002 | Delany et al. |
| 2004/0019785 A1 | 1/2004 | Hawkes et al. |
| 2005/0138204 A1 | 6/2005 | Iyer et al. |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos |
| 2008/0255997 A1 | 10/2008 | Bluhm et al. |
| 2008/0262991 A1 | 10/2008 | Kapoor |
| 2008/0320000 A1 | 12/2008 | Gaddam |
| 2009/0198682 A1 | 8/2009 | Buehler et al. |
| 2010/0125913 A1 | 5/2010 | Davenport et al. |
| 2011/0004771 A1 | 1/2011 | Matsushima |
| 2011/0179492 A1 | 7/2011 | Markopoulou et al. |
| 2011/0276604 A1 | 11/2011 | Hom et al. |
| 2011/0276716 A1 | 11/2011 | Coulson |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0254333 A1 | 10/2012 | Chandramouli |
| 2012/0260341 A1 | 10/2012 | Chan et al. |
| 2013/0104191 A1 | 4/2013 | Peled et al. |
| 2013/0138428 A1 | 5/2013 | Chandramouli |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko |
| 2013/0291103 A1 | 10/2013 | Davenport et al. |
| 2013/0318604 A1 | 11/2013 | Coates et al. |
| 2014/0003606 A1 | 1/2014 | Birnbaum et al. |
| 2014/0006785 A1 | 1/2014 | Shaliv et al. |
| 2014/0004102 A1 | 2/2014 | Ramsey et al. |
| 2014/0047544 A1 | 2/2014 | Jakobsson |
| 2014/0051432 A1 | 2/2014 | Gupta |
| 2014/0222712 A1 | 8/2014 | Samaha |
| 2014/0373151 A1 | 12/2014 | Webb et al. |
| 2015/0019323 A1 | 1/2015 | Goldberg |
| 2015/0040225 A1 | 2/2015 | Coates et al. |
| 2015/0074390 A1 | 3/2015 | Stoback |
| 2015/0113258 A1 | 4/2015 | Grieco et al. |
| 2015/0135287 A1 | 5/2015 | Medeiros et al. |
| 2015/0156212 A1 | 6/2015 | Khatri et al. |
| 2015/0186618 A1 | 7/2015 | Poorvin |
| 2015/0220918 A1 | 8/2015 | Davis et al. |
| 2015/0222652 A1 | 8/2015 | Ramsey et al. |
| 2015/0269570 A1 | 9/2015 | Phan |
| 2015/0271047 A1 | 9/2015 | McLean |
| 2015/0324457 A1 | 11/2015 | McLean |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey |
| 2016/0139886 A1 | 5/2016 | Perdriau |
| 2016/0182546 A1 | 6/2016 | Coates et al. |

(56) References Cited

U.S. PATENT DOCUMENTS

| | | |
|---|---|---|
| 2016/0241591 A1 | 8/2016 | Ramsey et al. |
| 2016/0277423 A1 | 9/2016 | Apostolescu et al. |
| 2016/0313709 A1 | 10/2016 | Biesdorf |
| 2016/0337400 A1 | 11/2016 | Gupta |
| 2016/0342805 A1 | 11/2016 | Lim |
| 2016/0378978 A1 | 12/2016 | Singla |
| 2017/0026343 A1 | 1/2017 | Wardman |
| 2017/0063893 A1 | 3/2017 | Franc et al. |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0214675 A1 | 7/2017 | Johnsrud |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0308872 A1 | 10/2017 | Uhr et al. |
| 2017/0318034 A1 | 11/2017 | Holland et al. |
| 2017/0359368 A1 | 12/2017 | Hodgman |
| 2017/0366348 A1 | 12/2017 | Weimer et al. |
| 2018/0077189 A1 | 3/2018 | Doppke |
| 2018/0089574 A1 | 3/2018 | Goto |
| 2018/0091306 A1 | 3/2018 | Antonopoulos |
| 2018/0101842 A1 | 4/2018 | Ventura et al. |
| 2018/0124073 A1 | 5/2018 | Scherman et al. |
| 2018/0124085 A1 | 5/2018 | Frayman |
| 2018/0152480 A1 | 5/2018 | Kinder et al. |
| 2018/0181599 A1 | 6/2018 | Crabtree et al. |
| 2018/0288198 A1 | 10/2018 | Pope et al. |
| 2018/0367550 A1 | 12/2018 | Musuvathi et al. |
| 2018/0375668 A1 | 12/2018 | Diehl |
| 2019/0014149 A1 | 1/2019 | Cleveland et al. |
| 2019/0037406 A1 | 1/2019 | Wash |
| 2019/0050554 A1 | 2/2019 | Fiske |
| 2019/0095801 A1 | 3/2019 | Saillet et al. |
| 2019/0102646 A1 | 4/2019 | Redmon |
| 2019/0104154 A1 | 4/2019 | Kumar et al. |
| 2019/0109717 A1 | 4/2019 | Reddy |
| 2019/0122258 A1 | 4/2019 | Bramberger et al. |
| 2019/0132131 A1 | 5/2019 | Clements |
| 2019/0132344 A1 | 5/2019 | Lem et al. |
| 2019/0141079 A1 | 5/2019 | Vidas et al. |
| 2019/0149564 A1 | 5/2019 | McLean |
| 2019/0171849 A1 | 6/2019 | Assenmacher |
| 2019/0173919 A1 | 6/2019 | Irimie |
| 2019/0179801 A1 | 6/2019 | Jang |
| 2019/0297096 A1 | 9/2019 | Ahmed et al. |
| 2019/0342296 A1 | 11/2019 | Anandam |
| 2019/0347433 A1* | 11/2019 | Chakravorty ............ H04L 9/30 |
| 2019/0377832 A1 | 12/2019 | McLean et al. |
| 2019/0379678 A1 | 12/2019 | McLean et al. |
| 2020/0036750 A1 | 1/2020 | Bahnsen |
| 2020/0183950 A1* | 6/2020 | Gaillardetz ............ H04L 9/0643 |
| 2020/0259791 A1 | 8/2020 | Garcia et al. |
| 2020/0351302 A1 | 11/2020 | Kyle |
| 2020/0351307 A1 | 11/2020 | Vidas et al. |
| 2020/0356665 A1 | 11/2020 | Denney et al. |
| 2020/0358795 A1 | 11/2020 | Urbanski et al. |
| 2020/0358819 A1 | 11/2020 | Bowditch et al. |
| 2020/0364338 A1 | 11/2020 | Ducau et al. |
| 2020/0394309 A1* | 12/2020 | Angelo ............ H04L 9/30 |
| 2021/0014067 A1 | 1/2021 | Clements |
| 2021/0067562 A1 | 3/2021 | Kinder et al. |
| 2021/0109797 A1* | 4/2021 | Zhou ............ H04L 67/10 |
| 2021/0185057 A1 | 6/2021 | McLean |

FOREIGN PATENT DOCUMENTS

| | | |
|---|---|---|
| WO | WO2007002749 A2 | 1/2007 |
| WO | WO2007090605 A1 | 8/2007 |
| WO | WO2010059843 A2 | 5/2010 |
| WO | WO2021/067238 A1 | 4/2021 |

OTHER PUBLICATIONS

Sofya Raskhodnikova & Adam Smith; CSE 598A Algorithmic Challenges in Data Privacy; Lecture 2; Jan. 19, 2010.

Github, Inc.; https://github.com/blockstack-packages/blockchain-id-deprecated/wiki/Home; Oct. 15, 2015 (last edited).

Github, Inc.; https://github.com/blockstack-packages/blockchain-id-deprecated/wiki/Blockstore; Sep. 3, 2015 (last edited).

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y.; Reengineering Legacy Systems with RESTFul Web Service; 2008 32$^{nd}$ Annual IEEE International Computer Software and Applications Conference, 2008; pp. 785-790; doi: 10.1109/COMPSAC.2008.89; 2008.

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.

Urlvoid; URLVoid.com; retrieved from archives.org: https: web.archive.org/web/20180730215132/https:.://www.urlvoid.com/); Published Jul. 30, 2018.

* cited by examiner

SYSTEMS AND METHODS FOR DISTRIBUTED EXTENDED COMMON VULNERABILITIES AND EXPOSURES DATA MANAGEMENT

TECHNICAL FIELD

In one aspect, the present disclosure relates to security data management, and more specifically, systems and methods for distributing, storing, and/or validating common vulnerabilities and exposures intelligence entries using blockchain. Other aspects also are described.

BACKGROUND

Existing security vulnerabilities and exposures intelligence databases, such as databases that provide entries or definitions for publicly disclosed or known security vulnerability and exposure intelligence, such as Cybersecurity Vulnerabilities and Exposures ("CVEs"), are generally made available online (e.g., one such database is provided by the MITRE Corporation of Bedford Mass., which organizes and runs a centralized online system providing access to information in their database as a whole via a search engine). Available centralized systems however historically have faced many problems and various disadvantages. For example, existing systems experience considerable delays, with contributors becoming frustrated with available systems, due to the fact that it can take a significant amount of time, such as many months or even several years, before new entries or updates thereto are assigned/released, creating a significant backlog of entries and potentially giving malicious actors time to develop new/different tactics that cannot be quickly detected. Further, since these centralized systems generally are owned and maintained by one, or only a few, specific entities that have exclusive control thereof, security researchers and analysts typically cannot effectively participate in developing new entries or updates thereto, and further do not receive adequate credit when they do contribute. Still further, because the intelligence entries and updates thereto are subject to being rejected outright by the controlling entities, e.g., for being viewed as out of scope, many important entries and updates developed/discovered by security analysts and others in the security field are never even considered for inclusion in existing databases, potentially resulting in significant coverage gaps.

Accordingly, it can be seen that a need exists for more efficient ways of security entry and update verification for security vulnerabilities and exposures intelligence databases, and in particular, for systems and methods that enable decentralized sharing, validation, and storing of cybersecurity knowledge or intelligence and that can incentivize consensus based updates in the cybersecurity intelligence community, while also allowing for the release of intelligence information quicker, without having to go through one or only a few entities. The present disclosure addresses these and other related and unrelated problems in the art.

SUMMARY

Briefly described, the present disclosure is generally directed to techniques for management of data, reward, and authority associated with a distributed security vulnerabilities and exposures intelligence system. The system can store security entries and updates thereto that can include Common Vulnerabilities and Exposures ("CVEs") or Extended Common Vulnerabilities and Exposures ("ECVEs").

In one aspect, a distributed security vulnerabilities and exposures intelligence system can include a secure chain of data blocks stored on computing nodes including computing devices or other suitable information handling systems. The computing nodes can be part of a distributed network(s) of public or private computing nodes, and store and maintain the chain of data blocks securely, as a blockchain. The chain of data blocks maintained in each computer node further contains data blocks that represent one or more validated updates to security entries, such as CVEs or ECVEs. Blocks can be added to the blockchain periodically, as new updates are proposed, and synced across all computing nodes, with each computer node on the distributed network acting as miner of the blocks using a Proof of Work ("PoW") algorithm or workflow to secure the blockchain, which miners can receive digital tokens as compensation. The computing nodes on the distributed network further may be configured to act either or both as validator and voter of the updates using a Proof of Stake ("PoS") algorithm or workflow, and also can receive and distributing digital tokens as compensation for voting or validation. The blockchain generally enables the creation and maintenance of a digital ledger or record of transactions on a ledger of records among the distributed computing network, and uses cryptography to allow each participant on the network to manipulate the ledger securely, without the need for a central point of control.

The system also can provide rewards to incentivize contributions, and more openness and flexibility using a democratic approval process for entry and update verification. For example, the distributed security vulnerabilities and exposures intelligence system may include a merit distribution mechanism on the blockchain that may reward users with digital tokens for creating and updating security entries. Issuance of these digital tokens provides a way to reward and incentivize contributors and validators, and also ensure that anyone who uses the intelligence system becomes a "shareholder" of the data. The digital tokens further can be used to enable access, enact revisions, and power the system. For example, if a user identifies incorrectness in an entry field, the user can commit an amount of digital tokens to challenge it. If a majority of committed stake from other contributors (validators) agrees with the dissenting user, on a consensus basis, an amendment can be made to the entry and the dissenting user's digital tokens may be returned along with some additional digital tokens, as compensation. Similarly, if a user identifies relevant extra data to be added to an ECVE, and other contributors (validators) agree with that addition, on a consensus basis, additions will be made, and digital tokens can be rewarded to that contributor. Validators who agree with the consensus decision to either approve or reject an update also may receive digital tokens as compensation.

In another aspect, a method for validating and storing security vulnerabilities and exposures intelligence entries is provided. This method can include storing a secure chain of data blocks in computing nodes including information handling systems that are part of a distributed network of computing nodes. The set of computing nodes part of that network store and maintain the chain of data blocks, securely. Each block represents one or more security entries or updates thereto, such as CVEs or ECVEs. The method further comprises adding blocks to the chain periodically (e.g., when new entries or updates thereto are proposed by participants) and syncing across all computing nodes in response to determining that update data associated with the last data block are valid. These method steps can be implemented by one or more processors operatively coupled with storage or memory associated with the given computer node.

In a further aspect, a computer program product can include a digital token program or module having encoded therein executable code of one or more software programs. The one or more software programs, when executed by one or more processors implement steps of: minting of new digital tokens, locking of digital tokens during the security entry or update consensus process, and transfer of digital tokens. The one or more processors can be included in a computer node that is part of a set of computing nodes in a distributed network thereof wherein each confirms the minting of new digital tokens, lock of digital tokens during the entry and update consensus process, and transfer of digital tokens.

In yet another aspect, a computer program or computer program product comprises a voting program or module. The voting program can have encoded therein executable code of one or more software programs, workflows, etc., which has scope to elect approval or rejection of each security entry or update based on a PoS consensus algorithm. The voting program can be configured to facilitate majority stake consensus approval mechanism for entries or updates. When approved, new entries or updates can be persisted on the blockchain in a trustless manner.

Accordingly, illustrative embodiments of the present disclosure advantageously provide effective techniques for validating, managing, and storing data related to vulnerabilities and exposures intelligence entries and updates, such as updates to CVEs or ECVEs. These embodiments provide a secure and robust approach to tracking, amending, and appending information related to such security entries, and the various fields of the security entries and updates may be securely tracked using the secure chain of data blocks. Furthermore, the digital token and voting system embodiments can provide effective techniques for providing an incentive and reward mechanism to all types of actors in the system, such as contributors, validators, and miners that secure the blockchain on the network.

Other various objects, features, and/or advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
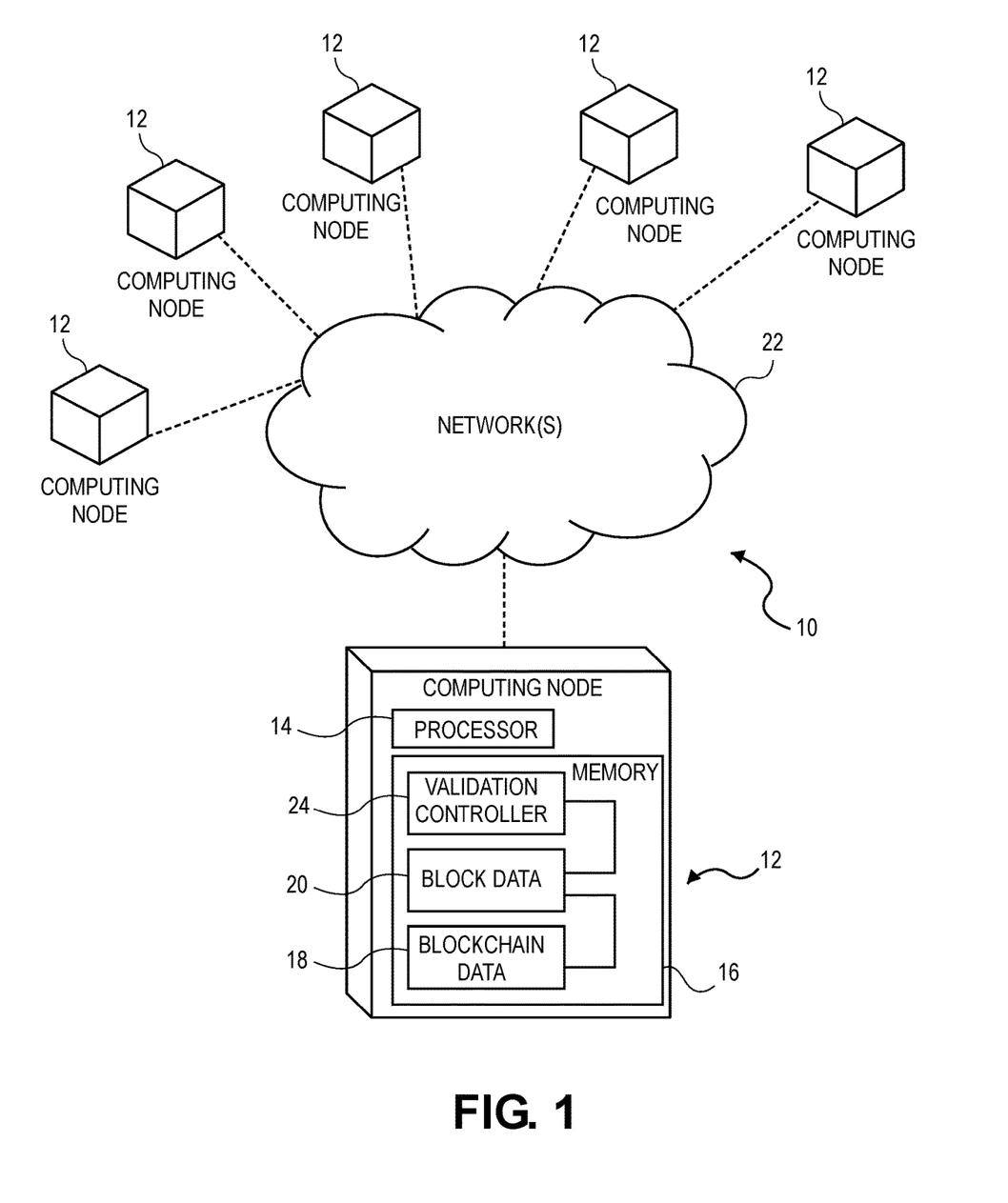
FIG. 1 illustrates a schematic diagram of a distributed system for tracking, validating, and/or maintaining security entries and updates thereto onto a blockchain according to the present disclosure.

FIG. 1 illustrates a distributed security vulnerabilities and exposures intelligence system 10 for validating and securely storing security entries or updates thereto according to the present disclosure. The security entries or updates can include Common Vulnerabilities and Exposures ("CVEs") entries or updates and/or Extended Common Vulnerabilities and Exposures ("ECVEs") entries or updates. CVEs and ECVEs can include a dictionary of definitions for publicly disclosed or otherwise known cybersecurity vulnerability and exposure intelligence, and can facilitate the sharing of data or information across separate vulnerability or threat reduction capabilities, such security tools, databases, and services. The present disclosure however is not limited to validating and sharing of CVEs and ECVEs and can used any suitable cybersecurity entries, updates, definitions, intelligence information, etc. that can be shared to facilitate the development of security or threat reduction tools, databases, modeling, detecting and/or services, without departing from the scope of the present disclosure.

As also illustrated in FIG. 1, the system 10 includes a plurality of computing nodes 12 each having a processor(s) 14 and a memory (or memories) 16 on which a blockchain datastore 18 and block datastore 20 are maintained. The plurality of computing nodes 12 can be managed by members of a threat intelligence community, such as a community that generates, shares, distributes, etc., threat intelligence entries for detecting security threats, developing cyber security tools, etc. The blockchain and block data 18/20 can include information or data related to submitted and/or validated security updates, such as CVE or EVCE updates. For example, the blockchain datastore 18 can include a chain of validated blocks, and the block data store 20 can include information related to a current being mined by the respective computing nodes 12. The system 10 also includes a network 22 or set of networks, with each computer node 12 being in communication with the network(s) 22, e.g., via a wireless or wired connection or other suitable connection that allows for the transmission and receipt of data or information. The network 22 can include a public or private network, and in one embodiment, the network 22 includes the internet or other publically available network, though any suitable public or private network can be used without departing from the scope of the present disclosure. In one example embodiment, the system 10 may initially begin using a private network that is access by only a few cybersecurity intelligence contributors and then transition to a larger public network as more and more contributors join or contribute.

According to the present disclosure, data blocks, e.g., related to security entries and/or updates, are added to the chain periodically and synced across all the computing nodes 10. In particular, the computing nodes 12 can receive broadcast security updates, e.g., by listening on a socket connection in communication with the network 22, from system contributors, participants or other security researchers or entities. The security updates then can be added to a current or latest block as one or more transactions that will be included in the blockchain if verified by the computing nodes 12. Accordingly, a secure chain of data blocks can be stored in the memory 16 of the computing node 20 such that the set of computing nodes 12 in communication with the network 18 store and maintain the chain of data blocks (blockchain) securely and in a distributed manner. Thus, the blockchain generally enables the creation and maintenance of a digital ledger or record of security entries and updates, e.g., CVE and ECVE updates, on a secure ledger of records distributed about the system 10. One benefit of storing CVEs and ECVEs on the blockchain ensures that data validation is decentralized and securely maintained, so as to improve CVEs or ECVEs access availability, replication, as well as higher level of censorship prevention, in comparison to existing centralized systems.

The system 10 further uses cryptography to allow each participant to manipulate the ledger securely, without the need for a central point of control. In particular, for each submitted and validated block added to the blockchain, the system 10 generates a hash of the previous block in the block chain and provides a hash value or information related thereto with the validated block to be stored in the blockchain datastore 18 in the memory 16 of the computing nodes 12. More specifically, the system 10 applies a cryptic hash function or other suitable hash function or algorithm to data or information of or related to the previous block in the block chain and adds the hash to the current block for identification thereof (e.g., the memory 16 of the computing nodes 10 can store instructions, workflows, etc. for the hash function or algorithm that can be accessed by the processors 14 and applied to data or information of or related to the previous block for generation of the hash value).

Each computer node 12 in the distributed network 22 additionally can act as a miner of blocks for the blockchain, with each computer node 12 including a validation controller 24 that facilitates mining of the blocks. In particular, when a contributor submits a new security update for consideration by network participants, e.g., as a new block to be added to the chain and synced across all computing nodes 12, each computing node 12 can apply the validation controller 24 that includes a Proof of Work ("PoW") workflow, algorithm, etc., to verify the blocks and secure the chain. The PoW generally facilitates validation and rejection of newly submitted blocks on a consensus basis. That is, in one embodiment, as discussed in detail in connection with FIGS. 4-6 below, the majority of system participants/stakeholders will determine whether an update gets validated or rejected using the PoW. However, in alternative embodiments, e.g., as discussed in connection with FIG. 7, validation can be controlled by votes that are weight based on digital tokens using a Proof of Stake ("PoS") algorithm, workflow, etc. Each computer node 12 on the distributed network may act either or both as a miner/validator and voter of security updates using PoW and PoS, and will receive and distribute digital tokens as compensation therefor. The PoW and PoS can be stored in the memories 16 of the computing nodes as part of the validation controller 24, though the PoW can be additional separate software programs or components without departing from the scope of the present disclosure.

In addition, the system 10 can include a digital token software program or module that facilitates creation, control, and/or distribution of digital tokens. For example, the system participants managing the computing nodes 12 may be granted one or more incentivizing rewards, such as digital tokens, notifications, payments, etc., for mining and validation of new blocks, and further contributors of new security entries or updates may be granted one or more incentivizing rewards for security updates that are validate and synced across all nodes, e.g., CVE and ECVE updates that are added to the blockchain ledger or database thereof. The digital token program can be configured to create or mint new digital tokens. The digital token program can be configured to lock the digital tokens, e.g., prevent creation or distribution thereof, during the security entry or update consensus process. And, the digital token program can be configured to transfer digital tokens to the computing nodes 12 when appropriate, e.g., as compensation for mining/validation or as an award for a validated security update. The digital token program can be part of the validation controller 24, though the digital token program can be a separate, additional program, component, etc., without departing from the scope of the present disclosure. One or more of the processors 14 of the computing nodes 10 will access and execute the digital token program or components thereof, which includes encoded therein executable codes, instructions, workflows etc. that when executed by one or more of the processors 14, causes the processors to generate and confirms the minting of new digital tokens, lock digital tokens during the entry/update consensus process, and transfer the digital tokens to appropriate participants.

In one embodiment, an ECVE blockchain may start off (genesis) as a private network, where only a small set of contributors or single contributor sync(s) the blockchain with the publicly available data set of existing CVEs. Then, the contributor(s) can open up connections to exhibit the blockchain to other potential contributors, miners, security analysis, researchers, etc. interested in maintaining, securing, and/or updating the ECVEs blockchain data base. The system further can benefit from network effect, with the system getting stronger and stronger as the network of miners and contributors grows in size and more and more cybersecurity intelligence information is included in the system, e.g., allowing for the development of more effective cybersecurity tools, databases, and services.

Figure 2:
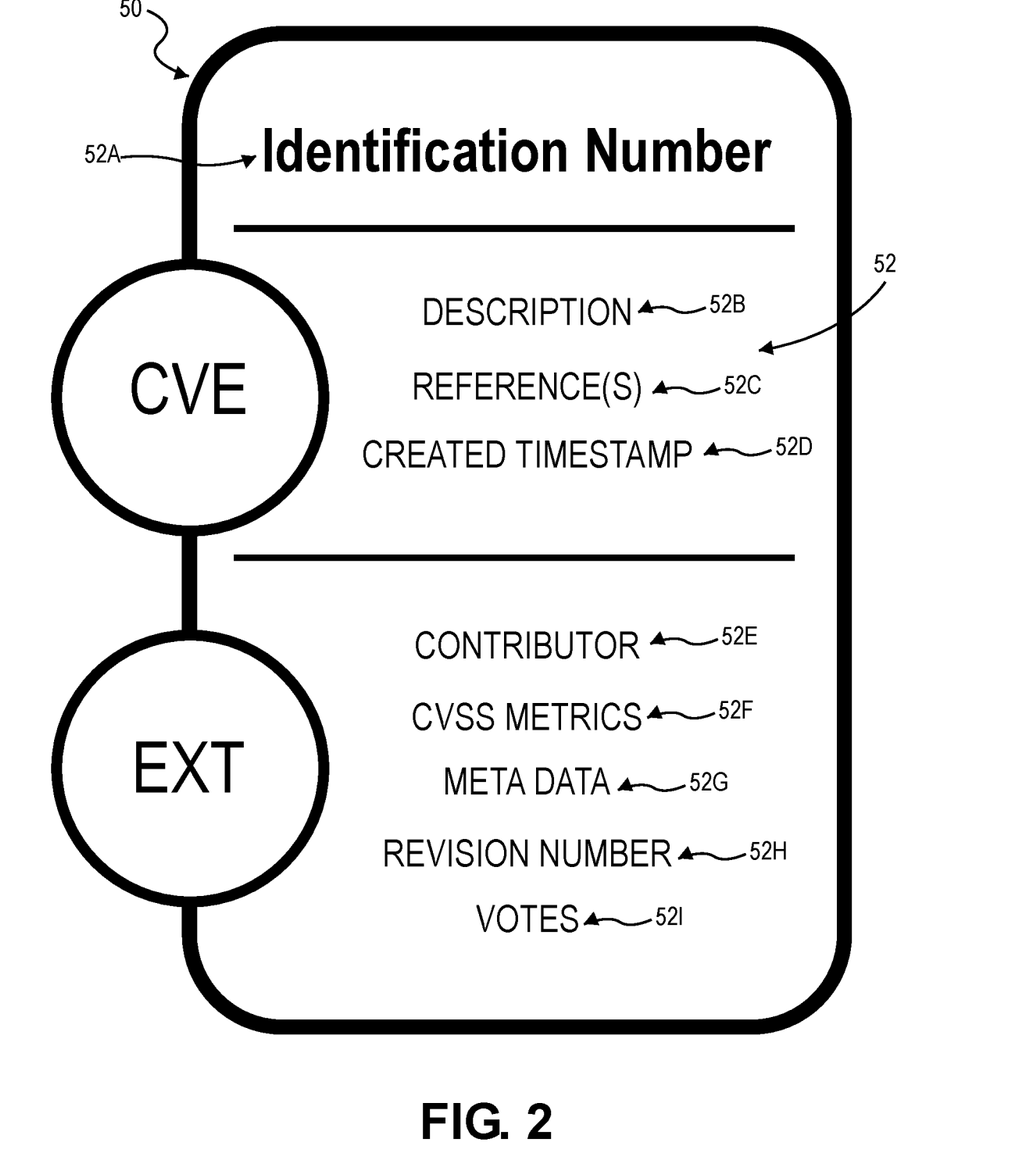
FIG. 2 shows a block in the blockchain including an ECVE entry with exemplary data according to the present disclosure.

FIG. 2 shows an example security update entry 50 that includes an ECVE revision entry with field definitions or information 52 that ECVE entities generally have to comply with. The EVCE field definition/information 52 generally extends the list of CVE fields definition with additional fields. In one embodiment, the ECVE field information 52 includes an identification string or other identifier 52A for the update (e.g., an alpha-numeric identifier with four or more digits in a sequence); a description 52B of the additional information or revision of information related to specific vulnerability or exposure intelligence information; at least one reference 52C related to the specific vulnerability and exposure intelligence information (e.g., the at least one reference can include a URL or other public reference, such as a vulnerability report, advisory, etc., that includes information supporting the entry or submission); time and date information 52D, such as a timestamp relating to a creation or validation time and date of the update; contributor information 52E identifying the contributor of the update, which allows the system 10 to attribute one or more digital tokens to that revision contributor; statistics or metric information 52F, such as Common Vulnerability Scoring System ("CVSS") metrics or other suitable metrics; metadata 52G; a revision number 52H, such as a number or other information indicating the number of revisions for the EVCE; and voting information 52I, such as information indicating the number or percentage of votes or weighted voted the revision received for validation; and/or other suitable information or data or combinations thereof. The present disclosure is not limited to EVCEs and can include CVEs or other suitable security entries or updates. For example, CVEs including an identification number or other identifier 52A; a description 52B; at least one reference 52C; as well as time and date information 52D can be used without departing from the scope of the present disclosure.

In one embodiment, these security update entries 50 may be stored outside the network of computing nodes 12, such as in a database or other suitable datastore in communication with the system 10; however, these security update entries can be stored in the memory 16 of one or more of the computing nodes 12, without departing from the scope of the present disclosure.

Figure 3:
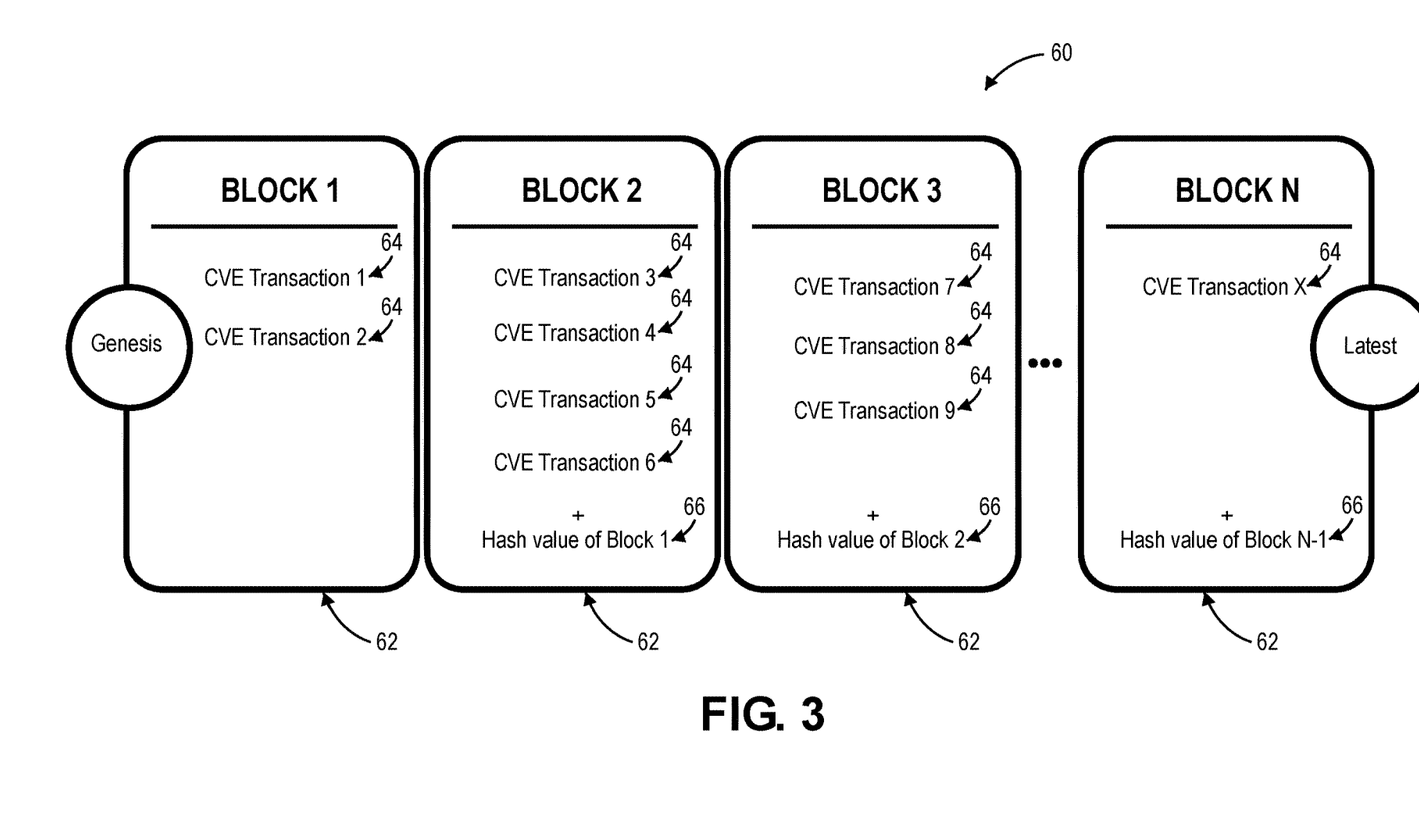
FIG. 3 shows a blockchain that tracks update transactions related to intelligence entries according to the present disclosure.

FIG. 3 illustrates an exemplary blockchain database 60 that tracks security update transactions related to one or more ECVE updates according to the present disclosure. Each computer node 12 in communication with the network 22 computes the blockchain 60. As shown in FIG. 3, each block 62 includes transaction information 64 related to one or more transactions including creating, amending, or appending data to one or more ECVE updates. The transaction information 64 can include the EVCE field information 52 shown in FIG. 2, and can include other suitable information related to the transaction without departing from the scope of the present disclosure. Each block 62 also includes a hash value 66 computed by hashing information or data of the previous block as described above. In the illustrated example shown in FIG. 4, Block N contains data of one ECVE update transaction plus a hash value of the previous block N−1 that represents all previous N−1 blocks. As further shown in the illustrated example, each block can include information related to a plurality or set of transactions 64. For example, in one embodiment, a time period can be set for updates, appendices, amendments, etc. to a specific security, and during that time period, each validated/verified update can be added as a transaction to the current block to be included in the blockchain, e.g., upon expiration of the set time period.

Typically, each block 62 can accommodate one or more transactions, and as the transactions flow into the network, each node of the network generally will be able to process them into a block in a timely manner. Alternatively, each block could represent only a single transaction, i.e., each security entry, e.g., a particular ECVE, and can have its own blockchain including verified updates, appendices, amendments, etc. thereto added as single blocks in the blockchain, for example, depending on possible block size limitations for receipt of the transactions within a selected cycle period. Furthermore, according to this disclosure, the block size, e.g., the number of transactions allowed to be included in each block, may be limited and/or increased to reduce the impact of spam, such as contributors presenting or validating meritless entries or updates, e.g., to allow action to be taken, such as modifying the software with other spam prevention systems.

Figure 4:
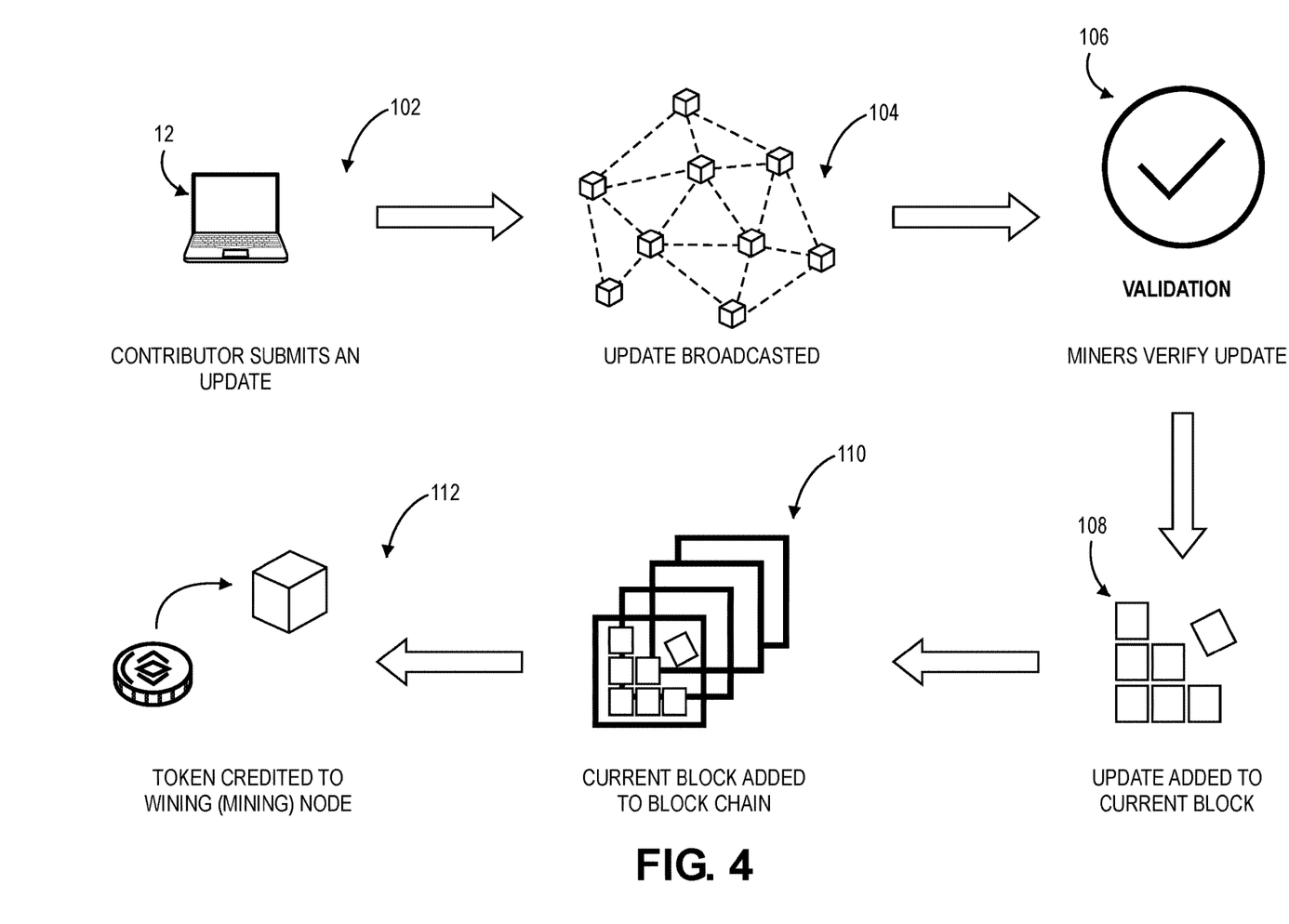
FIG. 4 provides a schematic illustration of a process for a security entry or update broadcast to all computing nodes on the network, along with its validation, storage, and digital token reward credited to a mining node according to one example of the present disclosure.

FIG. 4 illustrates a process for a security update broadcast to all computing nodes 12 on the network 22, along with its validation, storage, and reward according to one example of the present disclosure. As shown in FIG. 4, at 102, a contributor can submit an update for a security entry, e.g., using one of the computing nodes 12 or other computing device in communication with the network 22. Then, at 104, the submitted update is broadcast to each of the computing nodes 12. Upon receipt of the update, the computing nodes 12 will make a determination as whether to validate or verify the update, at 106. For example, the validation controller 24 can verify the update against a set of rules or requirements for validation. Information or data related to the current block can be stored in the block data store 20 during mining/validation thereof. If validated, at 108, the validated update is added to the current block, which in turn is added to the blockchain at 110. Information or data related to the blockchain is stored and maintained in the blockchain datastore 18 of the computing nodes 12. If the update is not validated, then the update is not added to the current block and likewise not added to the blockchain. In addition, a reward, e.g., one or more digital tokens, can be credited to the winning mining computing nodes 12, at 112. That is, each node of the majority of computing nodes that determined, e.g., voted, to validate or deny the update can be credited an amount of digital tokens.

Figure 5A:
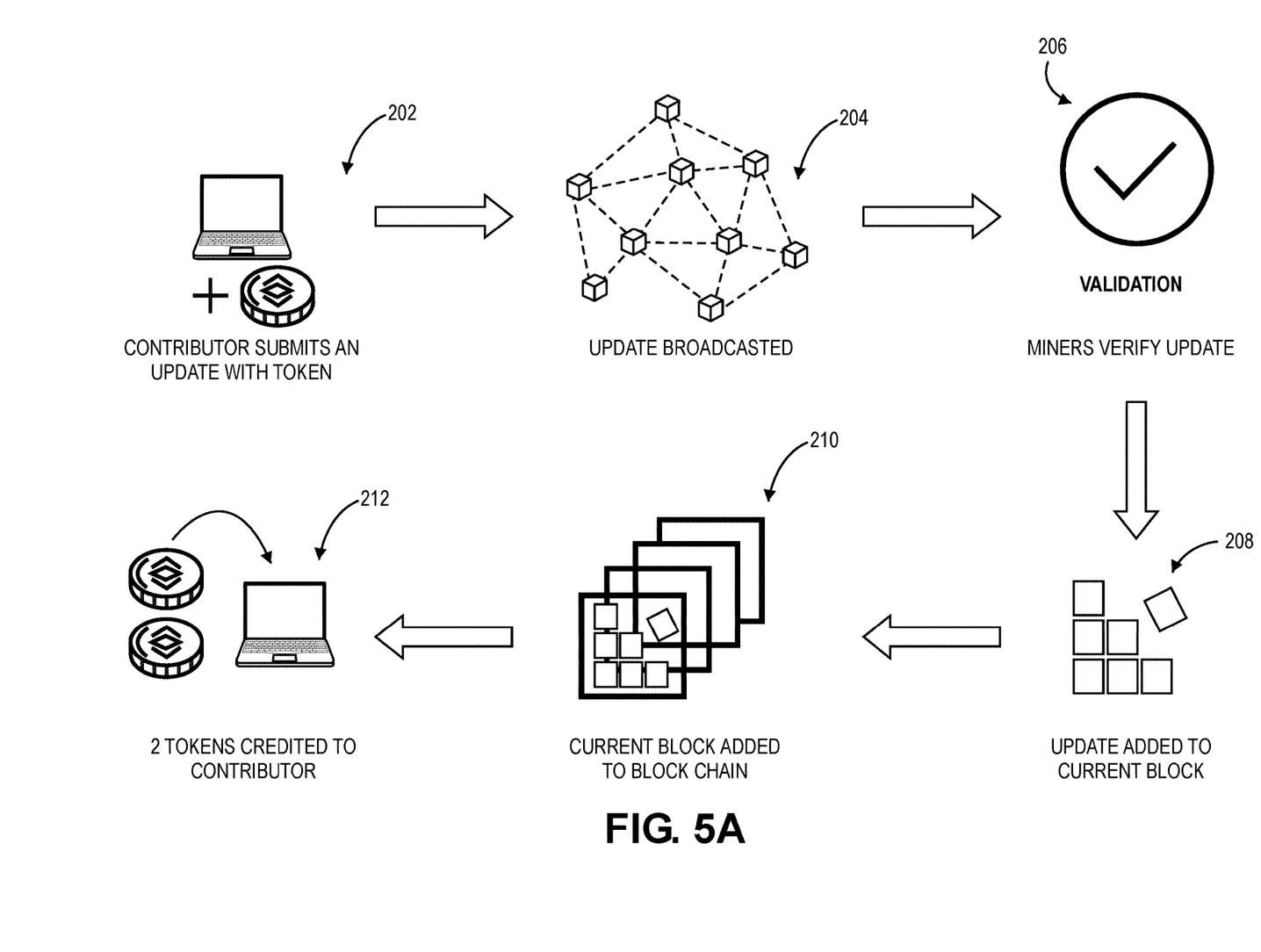
FIG. 5A provides a schematic illustration of a process of a token committed security entry or update broadcast to all computing nodes on the network, along with its validation, storage and digital token reward credited to the update contributor according to one example of the present disclosure.
Figure 5B:
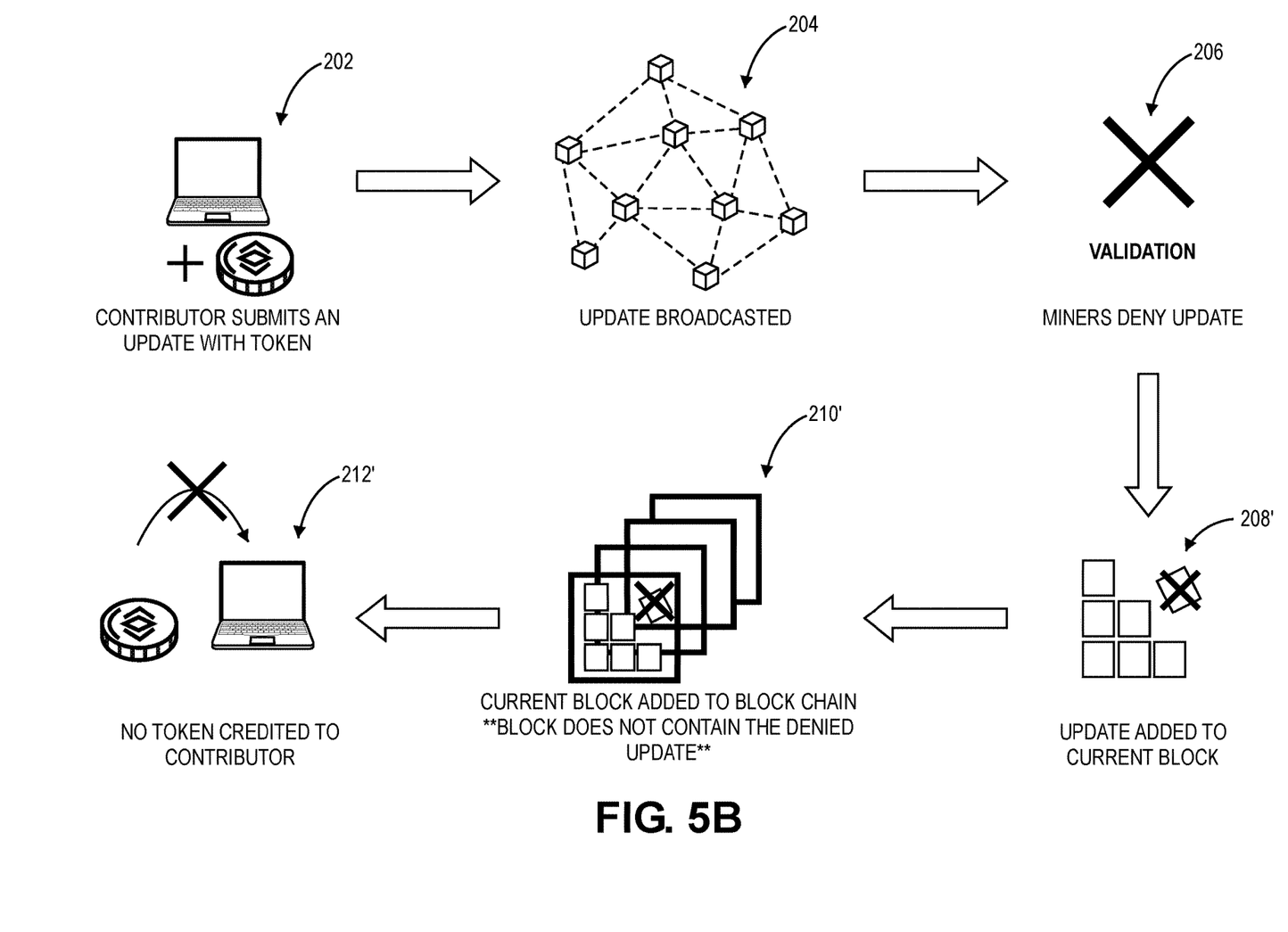
FIG. 5B illustrates a schematic diagram of a process for a digital token committed security entry or update broadcast to all computing nodes on the network, along with its rejection, and digital token kept away from the update contributor according to one example of the present disclosure.

FIGS. 5A-B provide a schematic illustration of a process of a token committed security entry or update broadcast to all computing nodes, along with its validation, storage and digital token reward according to an additional example of the present disclosure. As shown in FIGS. 5A-B, at 202, a contributor can submit an update for a security entry along with an amount of digital tokens, e.g., as a stake amount for risked for verification or denial of the update. Then, at 204, the submitted update is broadcast to each of the computing nodes 12. Again, upon receipt of the update, the computing nodes 12 will make a determination as whether to validate or verify the update, at 206.

FIG. 5A further shows that, if validated at 208, the validated update is added to the current block, which in turn is added to the blockchain at 210. As further shown in FIG. 5A, if the update is validated, the contributor is returned the amount of digital tokens put up for the contribution, as well as an addition amount of digital tokens as a reward. In the illustrated embodiment, the reward is equal to, or otherwise weighted based on, the amount staked for the submitted update—that is, the contributor put up/staked one digital token and was returned that digital token, as well as an additional digital token as a reward, totaling two digital tokens returned. The reward however can include any suitable percentage of the originally staked amount, such as 0.25, 0.33, 0.50, 0.75, 2, 3, 4, and up to 5 or more times the original amount or other integers or non-integers therebetween.

On the other hand, as shown in FIG. 5B, if the update is not validated, the update is not added to the current block (208'), and when the current block is added to the blockchain, the current block will not include the denied update (at 210'). In addition, the amount put forth by the contributor is forfeited and no digital tokens are credited to the contributor (at 212'). Accordingly, requiring commitment of digital tokens to propose updates, can protect the network against spamming, especially during its early phase, because contributors will incur consequences, e.g., lose digital tokens, if they submit meritless updates that are unlikely to be validated by the community.

In one embodiment, the validation controller 24 can include a voting program or module configured to establish validation and rejection on a consensus basis, wherein the majority stakeholders' weight determines whether an update gets validated or rejected. More specifically, the validation controller 24 can determine whether a majority of the computing nodes 12 validated or denied, the security entry or update, and if it is a determined that a majority validated the update, the updated is added to the current block and then to the blockchain; however, if it is determined that a majority denied the update, the update is not added to the current block and not included in the blockchain. The validation module 24 can be configured to validate the updates either automatically or to facilitate manual validation by security analysts. For automatic validation, the validation controller 24 will use the Proof of Work ("PoW") algorithm, workflow, etc. that contains a set of rules that must be meet for validation. For example, the PoW can require that the submitted security updates include specific fields or information, and if the submitted entry is missing a required field, the entry or update is denied. In one embodiment, a valid duplication ID, description, and reference may be required, and if any of the duplication ID, description, or reference are missing, validation of the security entry or update will be denied by the validation controller 24.

For manual validation, the validation controller 24 can simply receive votes for the validation or denial of security entries and/or updates. Furthermore, the validation controller 24 can set a specific confirmation time interval during which votes can be cast for validation, and a majority of votes that are cast within the confirmation time interval can determine whether the security entry or updates are validated or denied. For example, the validation controller 24 can start a timer when the security entry or update is received from the submitting contributor, with the timer being set to run for the confirmation time interval, and when the timer expires, the validation controller 24 can determine the number of votes for or against validation, and validate or deny validation based on the majority of votes. The confirmation time of each block can vary and generally will be selected or set to a time cycle of a length sufficient to allow enough manual validators to get the necessary time to vote for the proposed updates, such as a specific number of days, weeks, months, or years.

Notably, if a computer node 12 (miner), or set of computing nodes 12 (miners) does, or do, not validate/reject one or more updates according to the set of rules shared by the majority of computing nodes, then, those computing nodes could potentially fork the blockchain, or at some point in time having to reject its own new block and merge the out of sync block from the majority chain (merging) to continue to participate in the majority network. However, the majority of computing nodes that do adhere to the predefined set of validation rules will all continue mining for the next block on the majority network. Thus, one benefit of validation based on consensus (in other words, the winning (over 50%) cumulative Proof Of Work) is that the majority has authority on validating updates that gets persisted in a block, allowing for a democratic voting system, where one or more community, or group of nodes, are free to follow a forked version of the original, in other words genesis state of the blockchain.

Figure 6:
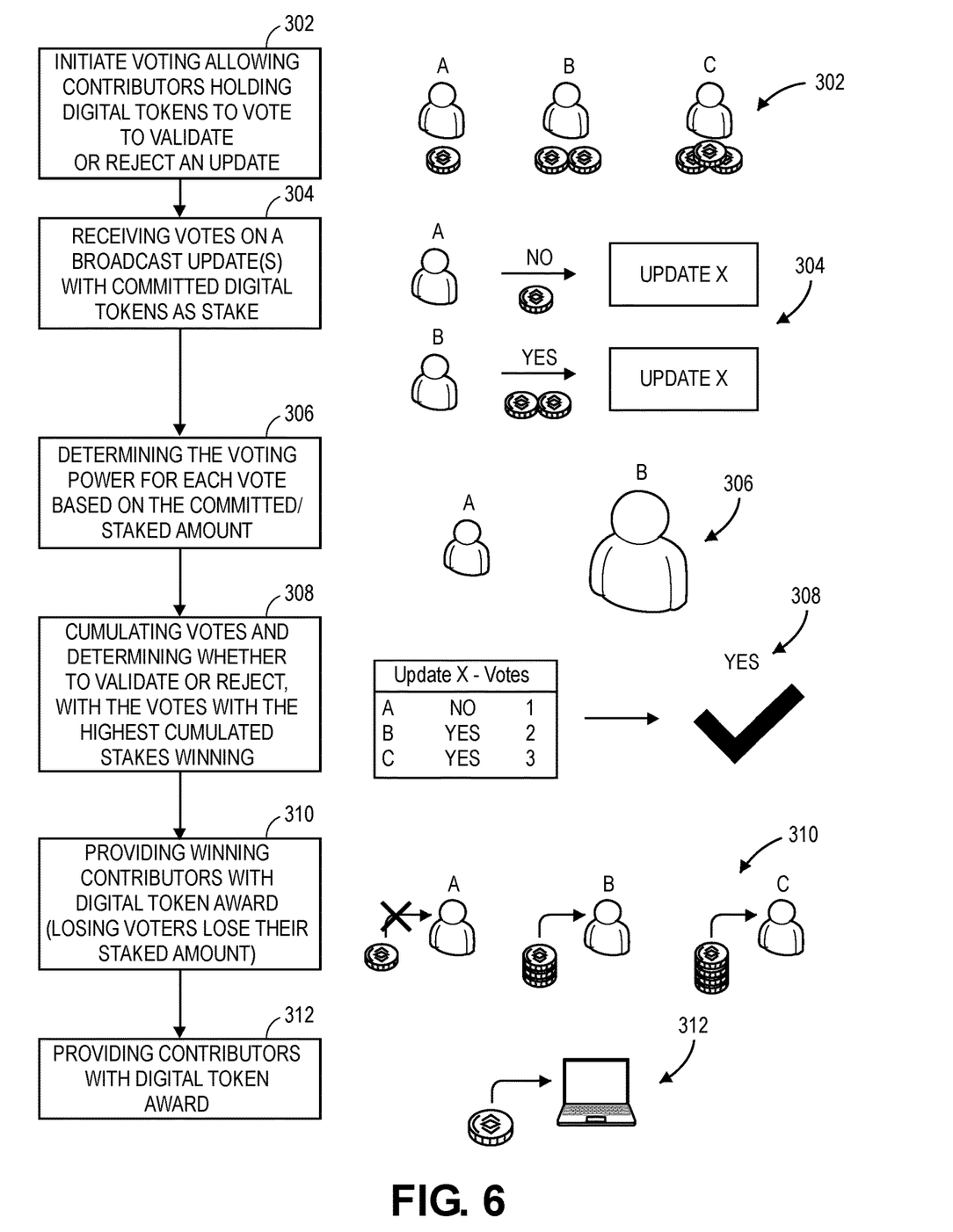
FIG. 6 illustrates a schematic diagram of the Proof of Stake ("PoS") validation process applied to an update broadcasted to all computing nodes on the network according to one example of the present disclosure.

FIG. 6 illustrates a Proof of Stake ("PoS") process of validation applied to an update broadcasted to all computing nodes on the network according to a further aspect of the present disclosure. As shown in FIG. 6, at 302, any of the participants who hold digital tokens have the ability to vote to validate or reject a security entry or update. At 304, upon broadcast of a security entry or update, the participants can vote on the broadcast by committing an amount of digital tokens as a stake. An upper limit may be placed on the amount of digital tokens that can be submitted for a vote, such as a specific number of digital tokens or percentage of digital tokens (e.g., no more than 75%, 50%, 25% or less, of the participant's total owned tokens or the total amount of existing tokens in the system); however, the participants may be allowed to stake unlimited amounts of digital tokens, e.g., all of their possessed digital tokens, without departing from the scope of the present disclosure.

Thereafter, at 306, the voting power of each of the participants is determined, e.g., weighted, by their staked amount, and as shown at 308, the votes with the highest cumulated stakes will win and determine whether the security entry or update is validated or denied. For example, the each validation or denial vote is weighted based on the total amount staked for each vote (e.g., if 1 token is staked, then 1 vote is counted; if 2 tokens are staked, then 2 votes are counted; 3 tokens are staked, then 3 votes are counted; and so on), and the total number of weighted votes are compared to determine the winner, with the highest total determining validation or denial.

At 310, the contributors that voted for the winning side, e.g., to validate or deny, are awarded digital tokens. The awarded tokens can be based on the total amount staked for each vote and the more staked increases the reward returned (e.g., the reward can be equal to the amount staked for the submitted vote; however, the reward can include any suitable percentage of the originally staked amount, such as 0.25, 0.33, 0.50, 0.75, 2, 3, 4, and up to 5 or more times the amount associated with the vote or other integers or non-integers therebetween). Also, as shown at 312, if the security entry or update is validated, the contributor gets a reward including digital tokens.

Figure 7A:
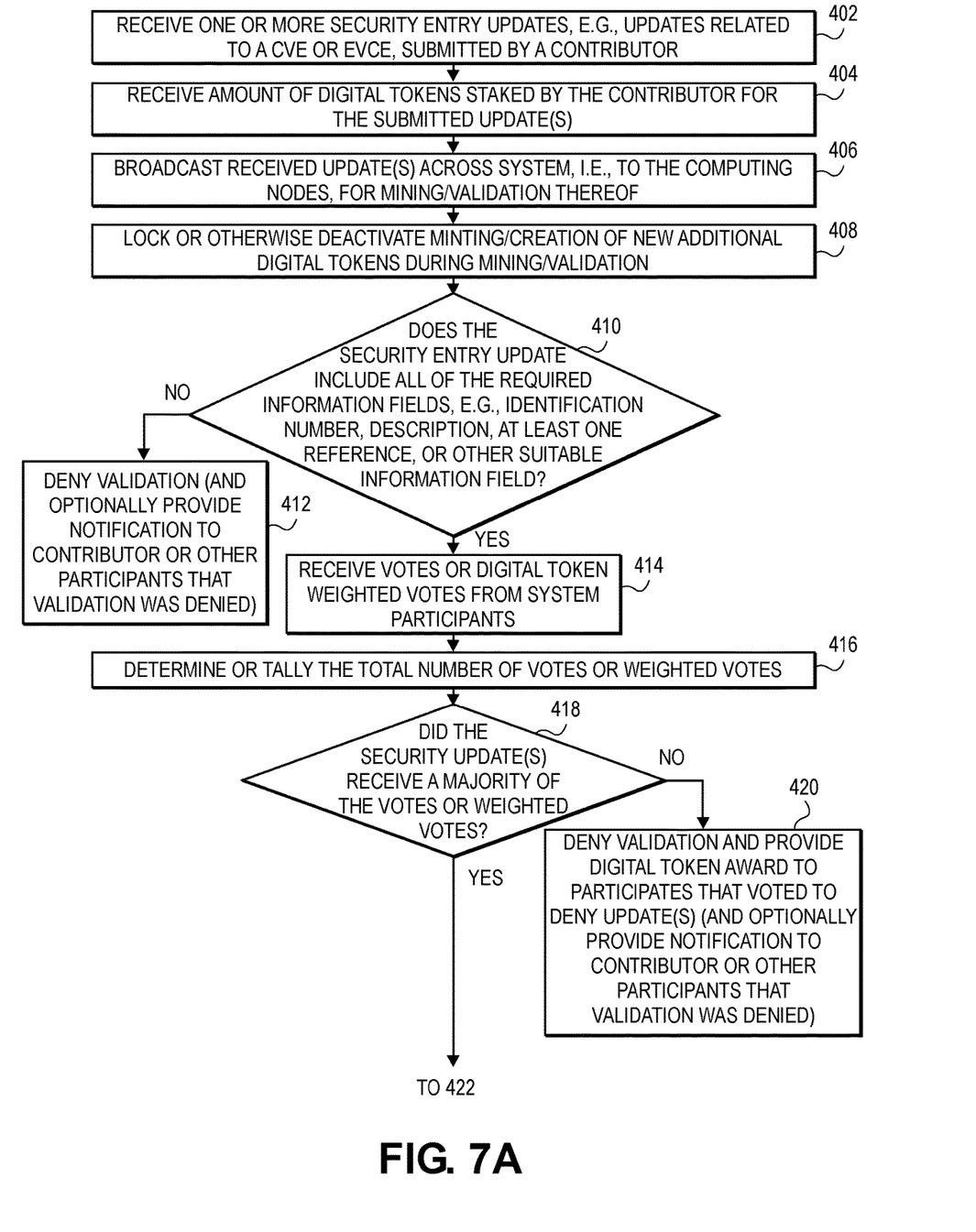
FIGS. 7A and 7B illustrate a process or method for validating and securely storing security entry updates according to one aspect of the present disclosure.
Figure 7B:
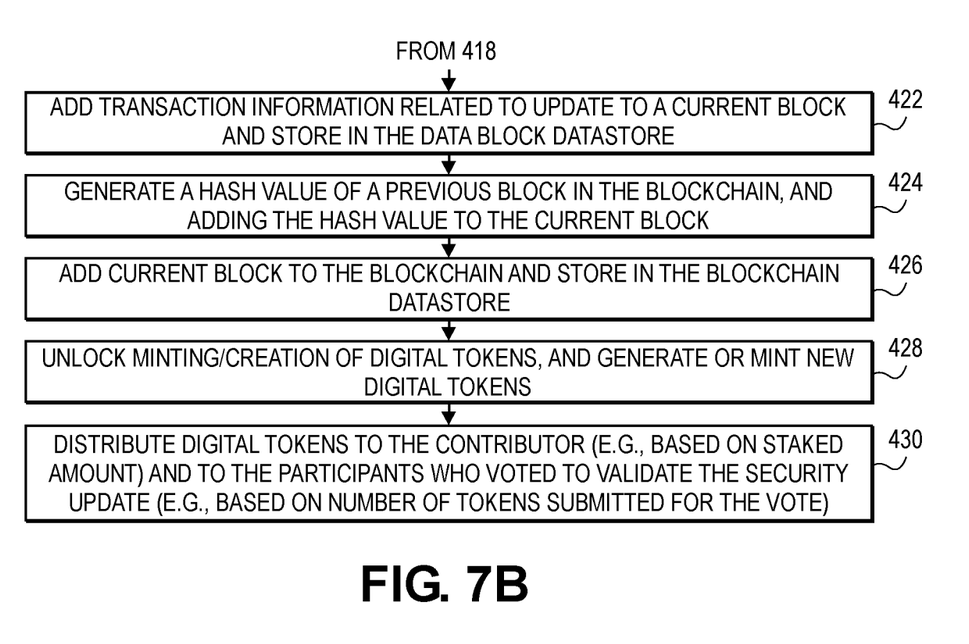

FIGS. 7A and 7B illustrate a process or method for validating and securely storing security entry updates according to one aspect of the present disclosure. As shown in FIG. 7A, at 402, one or more security updates, e.g., updates related to a CVE or ECVE, submitted by a contributor are received. In addition, information related to an amount of digital tokens staked by the contributor for the submitted updates also can be received. Thereafter, the received updates can be broadcast across the system, i.e., to each of the various computer nodes 12, for mining or validation thereof. During this mining or validation period, minting or creation of new additional digital tokens may be locked or otherwise deactivated, as shown at 408.

FIG. 7A further shows that, at 410, it is determined whether the security entry update includes all of the required information fields, such as identification number, description, at least one reference, or other suitable information fields or data. If the security entry update does not include all of the required information fields, validation is denied at 412. Optionally, at 412, a notification can be provided to the contributor or any other participants that validation was denied.

If the security update did include all of required fields, the process can continue on and votes or digital token weighted votes can be received from system participants (at 414). For the embodiment in which digital weighted votes are used, the system also will receive information related to a staked amount of digital tokens for each vote (at 414). Then, at 416, the total number of votes or weighted votes can be determined or tallied. It then can be determined whether the received security update received a majority of the votes or weighted votes at 418. If the received security update did not receive a majority of the votes or weighted votes, validation will be denied and a digital token award will be provided to participants that voted to deny the updates at 420. Optionally, at 420, a notification can be provided to the contributor or other participants that validation was denied.

FIG. 7B shows that if the security update did receive a majority of votes or weighted votes, at 422, transaction information related to the update can be added to a current block and stored in the blockchain data store of the computing nodes. A hash value of a previous block in the blockchain also can be generated and added to the current block at 424. Thereafter, the current block will be added to the blockchain and stored in the blockchain data store at 426.

As further shown in FIG. 7B, at 428, minting or creation of new digital coins can be unlocked and new digital coins can be generated or minted. Digital tokens then can be distributed to the contributor (e.g., based on the staked amount), as well as to the participants who voted to validate the security update (e.g., based on the number of tokens submitted for each vote). This process will generally repeat for each later received security entry updates.

Figure 8:
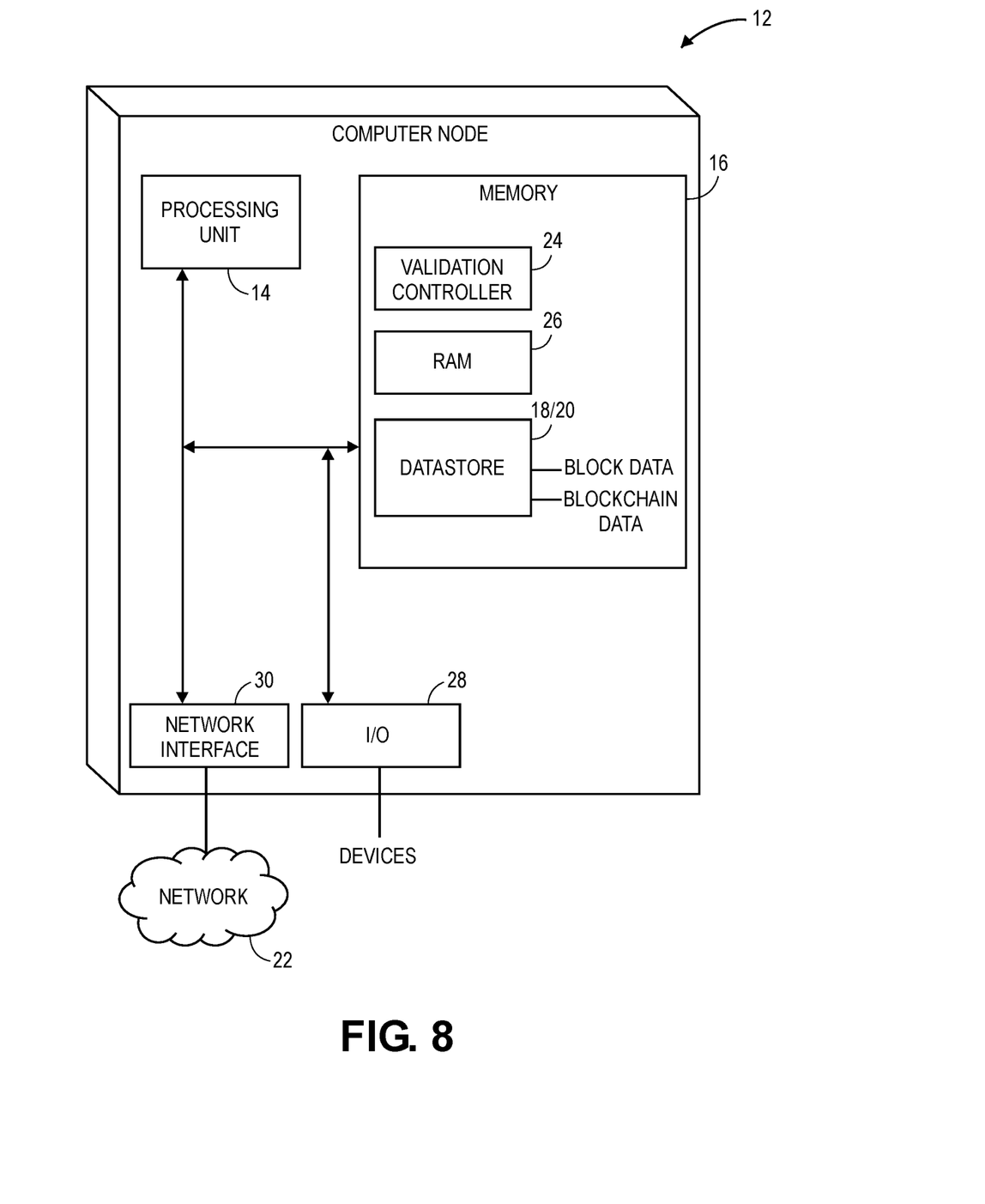
FIG. 8 shows a computing node according to one example of the present disclosure.

FIG. 8 illustrates an example computing node 12 according to the present disclosure. The computing node can include an information handling system that comprises computing elements to execute code of one or more software programs. The one or more software programs when executed by the one or more processors implement the processing steps discussed above, including but not limited to validation of contributors updates, storage and maintenance of integrity of the blockchain, granting network access to the blockchain, etc. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

As FIG. 8 shows, the information handling system 12 includes the memory 16 that can include the datastores 18/20; the validation controller 24 and/or other processing logic; a random access memory (RAM) 26, as well as ROM, and/or other types of nonvolatile memory. As also illustrated in FIG. 8, the information handling system 12 includes one or more processing resources such as the processing unit 14, which can include a central processing unit (CPU) or hardware or software control logic. The information handling system also includes one or more network interface devices or controllers 28 for communicating with the network 22 (or set of networks), as well as various input and output (I/O) devices 30, such as a keyboard, a mouse, touchscreen and/or a video display. Additional components of the information handling system may include one or more disk drives, one or more network ports for communicating with external devices, one or more buses operable to transmit communications between the various hardware components, etc. and/or other suitable computing elements or devices.

The foregoing description generally illustrates and describes various embodiments of this disclosure. It will, however, be understood by those skilled in the art that various changes and modifications can be made to the above-discussed constructions and systems without departing from the spirit and scope of this disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A method for validating and securely storing security updates amongst a threat intelligence community, comprising:
  receiving a security update submitted from one or more contributors to members of the threat intelligence community;
  broadcasting the received security update to a plurality of computing nodes in communication with one or more networks, each of the computing nodes managed by one or more of the members of the threat intelligence community and including a memory configured to store a blockchain;
  determining whether to validate the received security update at each computing node of the plurality of computing nodes, including:
    determining whether the received security update includes one or more required fields; and
    initiating voting among members of the threat intelligence community and receiving votes for validation or denial of the received security update from at least some of the members of the threat intelligence community; and
  if the received security update is validated by a selected number of votes or weighted votes from the members of the threat intelligence community:
    adding information relating to the received security update as transaction information in a current block; and
  including the current block in the blockchain stored in the memory of each computing node of the plurality of computing nodes; and
  if the received security update did not receive the selected number of votes or weighted votes, deny validation of the received security update.

2. The method of claim 1, wherein if the received security update is validated, the method further comprises:

providing an incentivizing award to at least one contributor of the one or more contributors of the received security update.

3. The method of claim 2, wherein the incentivizing award comprises one or more digital tokens.

4. The method of claim 1, further comprising:
generating hash value of a previous block in the blockchain and including the hash value in the current block.

5. The method of claim 1, wherein the one or more required fields include information related to an identifier, a description, and at least one public reference.

6. The method of claim 1, further comprising:
receiving a staked amount of digital tokens for the votes for validation or denial of the received security update from each computing node of the plurality of computing nodes; and
weighting the votes based on the staked amount of digital tokens for each vote to determine whether to validate or deny the received security update.

7. The method of claim 1, further comprising:
generating an amount of digital tokens staked for the security update by the one or more contributors, and
if the submitted security update is validated, providing a digital token award from the generated digital tokens award to the one or more contributors.

8. The method of claim 1, further comprising locking or deactivating generation of new or additional digital tokens during validation of the received security update.

9. The method of claim 1, wherein the security update comprises a Common Vulnerabilities and Exposures (CVE) update and/or an Extended Common Vulnerabilities and Exposures (ECVE) update.

10. A system for validating and securely storing security updates amongst a threat intelligence community, comprising:
a distributed network including a plurality of computing nodes, each of the computing nodes managed by one or more members of the threat intelligence community;
one or more processors at a series of computing nodes of a distributed network, wherein each of the computing nodes includes a memory having a datastore configured to store and manage a blockchain comprising a plurality of security updates; and
a non-transitory memory storing computer readable instructions that are accessed and executed by the one or more processors of the computing nodes to cause the computing nodes to:
receive a security update broadcast to the distributed network of computing nodes from at least one contributor;
determine whether to validate the received security update based on a set of rules, the set of rules including, at least, a determination that the received security update includes selected fields, and on votes or weighted votes received from members of the threat intelligence community to validate or deny the received security update; and
if the received security update is validated:
add information relating to the received security update as transaction information in a current block; and
include the current block in the blockchain in the datastore of each computing node of the plurality of computing nodes.

11. The system of claim 10, wherein the computer readable instructions that are accessed and executed by the one or more processors of the computing nodes further cause the computing nodes to generate hash value of a previous block in the blockchain and include the hash value in the current block.

12. The system of claim 10, wherein the one or more selected fields include information related to an identifier, a description, and at least one public reference.

13. The system of claim 10, wherein the computer readable instructions that are accessed and executed by the one or more processors of the computing nodes to determine whether a majority of votes or weighted votes received from members of the threat intelligence community is in favor of validation of the received security update comprise instructions configured to:
receive votes for validation or denial of the received security update from each computing node of the distributed network;
determine a total number of votes or weighted votes for validation or denial of the received security update; and
validate the received security update if a majority of received votes or weighted votes are in favor of validation of the received security update.

14. The system of claim 10, wherein the computer readable instructions that are accessed and executed by the one or more processors of the computing nodes further cause the computing nodes to:
generate an amount of digital tokens staked for the security update by the contributor, and
if the submitted security update is validated, provide a digital token award from the amount of generated digital tokens to the contributor.

15. The system of claim 14, wherein the computer readable instructions that are accessed and executed by the one or more processors of the computing nodes further cause the computing nodes to lock or deactivate generation of new or additional digital tokens during validation of the received security update.

16. The system of claim 10, wherein the security update comprises a Common Vulnerabilities and Exposures (CVE) update and/or an Extended Common Vulnerabilities and Exposures (ECVE) update.

17. The system of claim 10, wherein the computer readable instructions that are accessed and executed by the one or more processors of the computing nodes further cause the computing nodes:
if the received security update does not include the specific fields, transmit a notification to the contributor indicating that the received security update was denied due to lack of at least one field of the specific fields.

* * * * *